(12) United States Patent
Sauer et al.

(10) Patent No.: US 11,418,412 B2
(45) Date of Patent: Aug. 16, 2022

(54) OPERATIONAL CONSTRAINTS FOR OPERATIONAL FUNCTIONS OF FIELD DEVICES

(71) Applicant: Siemens Aktiengesellschaft, Munich (DE)

(72) Inventors: Markus Sauer, Munich (DE); Florian Zeiger, Höhenkirchen-Siegertsbrunn (DE)

(73) Assignee: SIEMENS AKTIENGESELLSCHAFT

( * ) Notice: Subject to any disclaimer, the term of this patent is extended or adjusted under 35 U.S.C. 154(b) by 6 days.

(21) Appl. No.: 17/262,792

(22) PCT Filed: Aug. 6, 2019

(86) PCT No.: PCT/EP2019/071117
§ 371 (c)(1),
(2) Date: Jan. 25, 2021

(87) PCT Pub. No.: WO2020/030636
PCT Pub. Date: Feb. 13, 2020

(65) Prior Publication Data
US 2021/0168050 A1    Jun. 3, 2021

(30) Foreign Application Priority Data
Aug. 7, 2018 (EP) .................................... 18187781

(51) Int. Cl.
*G06F 16/182* (2019.01)
*H04L 41/5009* (2022.01)
(Continued)

(52) U.S. Cl.
CPC ........ *H04L 41/5009* (2013.01); *G06F 16/182* (2019.01); *H04L 9/0643* (2013.01);
(Continued)

(58) Field of Classification Search
None
See application file for complete search history.

(56) References Cited

U.S. PATENT DOCUMENTS 9,261,868 B2 * 2/2016 Torigoe .............. G05B 19/0421
10,102,056 B1 * 10/2018 Goldberg ............ G06F 9/45558
(Continued)

FOREIGN PATENT DOCUMENTS

| EP | 3107248 A1 | 12/2016 |
|----|------------|---------|
| WO | WO 2018024341 A1 | 2/2018 |
| WO | WO 2018109598 A1 | 6/2018 |

OTHER PUBLICATIONS

"Network Functions Virtualisation (NFV); Management and Orchestration", ETSI Draft; ETSI GS NFV-MAN 001, European Telecommunications Standards Institute (ETSI), 650, Route Des Lucioles; F-06921 S.Ophia-Antipolis ; FRANCE; vol. ISG—NFV, No. V-MAN 001 VI.1.1; pp. 1-184, XP014311783, Retrieved from the Internet: URL:docbox.etsi.org\ISG\NFV\Open\Publications pdf\Specs-Reports\NFV-MAN 001vI.1.1—GS~ Management and Orchestration. pdf, [retrieved on Sep. 1, 2017] * Chapters 4-6. Annexes A and B.; 2017.
(Continued)

*Primary Examiner* — Mohamed Ibrahim
(74) *Attorney, Agent, or Firm* — Schmeiser, Olsen & Watts LLP (57) ABSTRACT

According to various examples, an operational constraint associated with an operational function—e.g., a virtual network function—implemented on a field device can be configured. According to further examples, the fulfillment of the operational constraint can be tracked. For these purposes, a distributed database is used, e.g., a blockchain.

14 Claims, 5 Drawing Sheets

(51) Int. Cl.
*H04L 9/06* (2006.01)
*H04L 67/101* (2022.01)
*H04L 67/1023* (2022.01)

(52) U.S. Cl.
CPC ........ *H04L 67/101* (2013.01); *H04L 67/1023* (2013.01); *H04L 2209/38* (2013.01)

(56) References Cited

U.S. PATENT DOCUMENTS

2012/0035746 A1* 2/2012 Broom ................. G06Q 10/087
  700/21
2016/0345082 A1* 11/2016 Armstrong ............... H04Q 9/00

OTHER PUBLICATIONS

Keller Manuel: "Commonalities of Network Function Virtualization, Blockchains and Smart Contracts", Communication Systems Seminar FS2018, XP055540288, Retrieved from the Internet: URL:https://files.ifi.uzh.ch/CSG/teaching/FS18/ComSys/Talk9.pdf [retrieved on Jan. 10, 2019]; pp. 21-27 and 33-35; 2018.

PCT International Search Report and Written Opinion of International Searching Authority dated Jul. 6, 2020 corresponding to PCT International Application No. PCT/EP2019/071117 filed Jun. 8, 2019.

EP Communication Pursuant to Article 94(3) EPC dated Oct. 28, 2019 for Application No. 18187781.2.

EP Partial European Search Report dated Jan. 18, 2019 for Application No. 18187781.2.

EP Extended Search Report dated Feb. 12, 2019 for Application No. 18187781.2.

\* cited by examiner

OPERATIONAL CONSTRAINTS FOR OPERATIONAL FUNCTIONS OF FIELD DEVICES

CROSS-REFERENCE TO RELATED APPLICATIONS

This application claims priority to PCT Application No. PCT/EP2019/071117, having a filing date of Aug. 6, 2019, which is based on EP Application No. 18187781.2, having a filing date of Aug. 7, 2018, the entire contents both of which are hereby incorporated by reference.

FIELD OF TECHNOLOGY

Various examples of embodiments of the invention generally relate to operational constraints for operational functions implemented on field devices. Various examples specifically relate to configuring the operational constraints and tracking fulfillment of the operational constraints.

BACKGROUND

Field devices with communication capabilities sometimes implement features through virtual network functions. Virtual network functions (VNF) offer a lot more flexibility if compared to traditional approaches, but also require close monitoring and tracking of configurations in order to avoid undesired or even malicious configurations that endanger integrity of communications.

For example, VNFs can be configured with operational constraints. Sometimes, it can be desired to track the fulfillment of the operational constraints to detect and act upon malicious circumvention of the operational constraints.

Currently, a transparent view on VNF configurations is not given by systems which always is a problem as soon as more stakeholders are involved—that is typically the case in existing and future scenarios with many field devices being connected while delivering data, as well as communication services. Having in mind that field devices can also be mobile, often reconfigurations (e.g. activation, deactivation, adaptation of access, adaptation of communication/SLA parameters) based on environmental states (e.g., speed, geo-position, logical placement) are required during runtime. Of course, all these reconfigurations need to be managed and validated in a transparent manner, where all involved stakeholders have a proof for proper configurations of their VNFs.

SUMMARY

An aspect relates to advanced techniques of configuring and tracking fulfillment of operational constraints for field devices. In particular, a need exists for techniques that are transparent and tamper-proof.

A node for tracking fulfillment of an operational constraint imposed on an operational function of a field device is provided. The node includes a retrieval module configured to retrieve a state signal. The state signal is indicative of an operational state of the operational function of the field device. The operational state is associated with the operational constraint. The node also includes a logging module configured to write, to a distributed database (dDB), the operational state. The operational state is written to the database with a reference to the operational function.

A method of tracking fulfillment of an operational constraint imposed on an operational function of a field device is provided. The method includes retrieving a state signal indicative of an operational state of the operational function of the field device, the operational state being associated with the operational constraint. The method further includes writing, to a dDB, the operational state referenced to the operational function.

A computer program product (non-transitory computer readable storage medium having instructions, which when executed by a processor, perform actions) or a computer program includes program code that can be executed by at least one processor. Executing the program code causes the at least one processor to perform a method of tracking fulfillment of an operational constraint imposed on an operational function of a field device is provided. The method includes retrieving a state signal indicative of an operational state of the operational function of the field device, the operational state being associated with the operational constraint. The method further includes writing, to a dDB, the operational state referenced to the operational function.

The field device may be a mobile device that, e.g., within hours or days or weeks or years routinely changes its location. For example, the field device may be a terminal connected to a communication network over-the-air. For example, the field device may be an industrial device or a user equipment. For example, the field device may be a vehicle, a robot, an assembly robot, etc.

For example, the node may be an infrastructure node of the infrastructure network of the dDB. For example, the node may be a provider node controlling operation of a communication network. For example, the node may be an internal node of the field device, e.g., implemented in software.

A dDB generally may be a database that is distributed over a multitude of infrastructure nodes of a corresponding infrastructure network, wherein transactions are selectively deposited in the dDB depending on a consensus between the infrastructure nodes. The infrastructure nodes may be geographically spread across multiple sites, locations, countries, or organizations. Such a consensus may be established by an algorithm like proof of work, proof of stake, or a voting system. In particular, the dDB may be implemented as a blockchain.

The operational function may be a VNF. Within the meaning of the present disclosure, a VNF may refer to a software implementation of an operational function of a field device, e.g., of a communication network. Such a software may run on a communication system adopted for providing VNFs and may be deployed on such a communication system. The communication system may include one or more communication nodes, wherein the VNF runs as a software implementation on one or more of these nodes, instead of having a custom hardware device for each network function. More specifically, a certain network function may be one of a firewall, an intrusion detection device, a load balancer, a control plane gateway, a data plane gateway, and a data connection gateway between at least two nodes of a data network.

The operational state can correlate with certain behaviour of the operational function. For example, the operational state can be indicative of an interaction of the field device with the environment of the field device, as controlled by the operational function. For example, the operational state could be indicative of a medium access to a band of the electromagnetic spectrum by the field device that is controlled by the operational function responsible for the medium access. Alternatively, the operational state could be indicative of whether or not a data communication has been established between the operational device and another party. The operational state can broadly refer to one or more values of operational parameters of the field device associated with the operational function.

The operational constraint can impose one or more boundaries or limitations to the operation of the operational function. For example, the operational constraint can define certain limits within which an operational parameter of the operational function is required to be set. For example, the operational constraint may define a maximum or minimum transmit power or a maximum talk time or a minimum mute time, in case the operational function is responsible for medium access of a band of the electromagnetic spectrum. In alternative examples, the operational constraint may define that a given operational function is altogether disabled.

By writing the operational state referenced to the operational function to the dDB, it is possible to facilitate a later check for the fulfilment of the operational constraint based on a comparison between the operational state and the operational constraint. For example, it can be checked—based on the information available in the dDB—whether the operational state was within certain boundaries imposed by the operational constraint. This is achieved in a tamper-proof manner, because the dDB typically offers a high level of security.

In some examples, the retrieval module is configured to retrieve the state signal from a sensor that is remote of the field device.

Hence, the fulfilment of the operational constraint can be externally monitored, e.g., by a third-party sensor that operates independently of the field device. For example, a scenario would be conceivable where the operational constraint is associated with a certain regulation of accessing a band of the electromagnetic spectrum, e.g., in terms of talk durations and mute durations. Then, the access to the band of the electromagnetic spectrum could be monitored by the sensor that is remote of the field device.

By using a sensor remote of the field device, security against corruption of the state signal can be increased.

In other examples, the retrieval module is configured to receive the state signal from the field device. In such scenarios, the field device itself can report the state signal.

This can simplify the architecture; for example, a third-party sensor may not be required.

The operational constraint can be conditional. This means that the operational constraint may not be fixedly activated; rather, the activation of the operational constraint can depend on one or more trigger criteria. Example trigger criteria include a timing and an environmental setting.

For example, the trigger criterion could specify that the operational constraint is active during nighttime, but not during daytime, i.e., define the timing.

In scenarios where the operational constraint is conditional on an environmental setting, the behaviour of the field device with respect to the environment can serve as the trigger criterion for activating/deactivating the operational constraint. As a general rule, various options are available for implementing the environmental setting conditionally activating/deactivating the operational constraint. For example, the environmental setting could be one of a location of the field device, a velocity of the field device, an acceleration of the field device, a temperature of certain parts of the field device or an environmental temperature in the surrounding of the field device, a pressure in the surrounding of the field device, and a brightness in the surrounding of the field device, just to give a few examples.

In such a scenario of a conditionally activated/deactivated operational constraint, it would be possible that the retrieval module is further configured to retrieve a further state signal indicative of the environmental setting, upon retrieving the state signal. Hence, there can be a time context between retrieving the state signal and the further state signal. Then, the logging module can be configured to write the operational state to the dDB with a further reference to the environmental setting.

The further state signal may be retrieved from an oracle that provides off-dDB data. For example, the oracle can provide a data feed that is indicative of certain environmental conditions.

Such techniques described in connection with the further state signal facilitate tracking whether the operational constraint is appropriately fulfilled in view of one or more trigger criteria for conditionally activating/deactivating the operational constraint.

According to some examples, the retrieval module can be configured to retrieve a constraint signal that is indicative of the operational constraint from the dDB. Then, the node may further include a monitoring module. The monitoring module is configured to perform a comparison between the operational state and the operational constraint. Such a comparison can correspond to a check for the fulfilment of the operational constraint. For example, the comparison can check whether the operational state of the field device stays within certain boundaries imposed by the operational constraint on one or more parameters of the operational function.

Then, if a breach of the operational constraint is detected, certain countermeasures may optionally be triggered. For example, the node may include a control module that is configured to control a parameter of the operational function of the field device, if the comparison indicates non-fulfilment of the operational constraint. In other words, if non-fulfilment of the operational constraint is detected, it would be possible to restrict the operation of the field device by active measures. For example, it would be possible to transition the operational function of the field device into a safe state. In other examples, it would be possible to enforce fulfilment of the operational constraint.

Alternatively or additionally, to such a control of the operation of the field device, it would also be possible to report the non-fulfilment of the operational constraint to a third party. For example, it would be possible that the node includes a report module. The report module can be configured to report the non-fulfilment of the operational constraint if the comparison of the state of the operational function with the operational constraints indicates a non-fulfilment of the operational constraint. For example, an operator of the field device can be informed accordingly. For example, another stakeholder that is affected by the non-fulfilment of the operational constraint may be informed accordingly. A warning message may be triggered.

A node for configuring an operational constraint associated with an operational function of a field device is provided. The node includes a retrieval module configured to retrieve a configuration signal from a dDB. The notification signal is indicative of the operational function and of the operational constraint. The node further includes a deployment module configured to request enforcement of the operational constraint at the field device.

A method of configuring an operational constraint associated with an operational function of a field device is provided. The method includes retrieving a configuration signal from a distributed database, the configuration signal being indicative of the operational function and of the operational constraint. The method also includes requesting enforcement of the operational constraint at the field device.

A computer program product or a computer program includes program code that can be executed by at least one processor. Executing the program code causes the at least one processor to perform a method of configuring an operational constraint associated with an operational function of a field device. The method includes retrieving a configuration signal from a distributed database, the configuration signal being indicative of the operational function and of the operational constraint. The method also includes requesting enforcement of the operational constraint at the field device.

By such techniques, the operational constraint can be flexibly activated or deactivated. The operational constraint can be dynamically (re-)configured.

According to some techniques, the node can further include a validation module that is configured to validate the operational constraint based on a service level agreement. The service level agreement is associated with the operational function on the subscriber associated with the field device.

In the sense of embodiments of the present invention "service level agreement" at least represents a committed configuration of a field device associated with a subscriber that is also associated with the service level agreement. This service level agreement may specify one or more operational functions. Moreover, the service level agreement data may specify certain hardware requirements and/or agreements, identifiers of selected operational functions, and/or certain operational constraints, which may have been agreed upon between a provider and a customer. Such hardware requirements may include transfer rates, digital bandwidth capacity, latency, a level of redundancy, and/or a location of communication nodes and/or customer nodes, which may exchange data wire a VNF. Such functional parameters may include address spaces, port ranges or ports, data handling or filtering capacity for data traffic over VNFs, logical configurations of a data network, and/or computing capacity or memory capacity for the VNFs. Furthermore, the preceding specifications may be associated with or defined by one or more service levels. For example, the service level agreement can specify whether a certain subscriber is bound by a candidate constraint or whether, e.g., the service plan of the subscriber allows to not obey the candidate constraint.

By validating the operational constraint, it becomes possible to tailor deployment of the operational constraint at the field device. For example, it can be checked whether for a certain subscriber it is even required to configure the operational constraint—or whether it is possible to operate the field device without the operational constraint. Thereby, different field devices can be treated differently; also different subscribers can be treated differently.

According to some examples, the node further includes a logging module. The logging module is configured to write request data to the dDB. The request data is written to the dDB along with a reference to the operational function. The request data is indicative of the requested enforcement of the operational constraint.

Thereby, it becomes possible to securely log activation/deactivation or (re-)configuration of the operational constraint.

A node for monitoring fulfillment of an operational constraint imposed on an operational function of a field device is provided. The node includes a retrieval module configured to retrieve a state signal indicative of an operational state of the operational function of the field device, the operational state being associated with the operational constraint. The retrieval module is further configured to retrieve a constraint signal indicative of the operational constraint from a distributed database. The node further comprises a monitoring module configured to perform a comparison between the operational state and the operational constraint.

A method of monitoring fulfillment of an operational constraint imposed on an operational function of a field device is provided. The method includes retrieving a state signal indicative of an operational state of the operational function of the field device, the operational state being associated with the operational constraint. The method further includes retrieving a constraint signal indicative of the operational constraint from a distributed database. The method further includes performing a comparison between the operational state and the operational constraint.

A computer program product or a computer program includes program code that can be executed by at least one processor. Executing the program code causes the at least one processor to perform a method of monitoring fulfillment of an operational constraint imposed on an operational function of a field device. The method includes retrieving a state signal indicative of an operational state of the operational function of the field device, the operational state being associated with the operational constraint. The method further includes retrieving a constraint signal indicative of the operational constraint from a distributed database. The method further includes performing a comparison between the operational state and the operational constraint.

BRIEF DESCRIPTION

Some of the embodiments will be described in detail, with references to the following Figures, wherein like designations denote like members, wherein.

DETAILED DESCRIPTION

In the following, various embodiments of the invention will be described in detail with reference to the appended figures it is to be understood that the following description of embodiments is not to be taken in a limiting sense. The scope of embodiments of the invention is not intended to be limited by the embodiments described hereinafter or by the figures, which are taken to be illustrative only.

The figures are to be regarded as being schematic representations and elements illustrated in the figures, which are not necessary the scope shown to scale. Rather, the various elements are represented such that their function and debt general purpose become apparent to a person skilled in the art. Any connection or coupling between functional blocks, devices, components or other physical or functional units shown in the figures or described herein may also be implemented by an indirect connection or coupling. A coupling between components may be established over a wireless connection. Functional blocks may be implemented in hardware, firmware, software or a combination thereof.

Hereinafter, techniques are described that facilitate configuring operational constraints associated with operational functions at field devices. Further, techniques are described that facilitate tracking of fulfilment of the operational constraints by the field devices.

The techniques described herein can be employed in various use cases. Examples include autonomous field devices such as autonomous vehicles, satellites, trains, drones, etc. Further examples include field devices associated with user equipment, e.g., cars, cellphones, entertainment equipment, etc. Further examples include components of industrial systems, e.g., power plants, rail networks, gas pipelines, etc.

As will be appreciated, there is a wide variety of types of user devices conceivable. Likewise, there is a wide variety of operational constraints conceivable. The type of operational constraint typically varies with the type of field device.

Hereinafter, the operational functions are described primarily in connection with VNFs. However, similar techniques may be readily applied to other kinds and types of functions.

Hereinafter, techniques are described that facilitate configuration updates of VNFs to enforce operational constraints. As a general rule, various kinds and types of operational constraints are conceivable. For example, a VNF or a certain subfunctions or certain functionality of a VNF may be disabled, at least temporarily. Certain operational parameters of the VNF, e.g., a transmit power etc., may be required to stay within certain boundaries.

The techniques described herein facilitate a transparent view on VNF configurations, specifically in view of the fulfillment of the operational constraints. The fulfillment of the operational constraints can be tracked. Non-fulfillment can be detected and, if desired, acted upon.

The techniques described herein enable a validation of required configuration updates of VNFs and enable an audit trail for VNF management, accounting, and constraint compliance.

Specifically, this is possible in view of operational constraints that can be configured or reconfigured.

According to various examples data/state and business logic integrity of system for user/provider VNF agreements can be tracked by involved partners by a dDB—and hereby trust between the parties can be reached. Specifically, it is possible to track, by the dDB, whether one or more operational constraints imposed on the VNF are fulfilled.

For example, in a scenario of non-fulfillment of an operational constraint by a field device, it would be possible to execute transactions in the dDB to keep a record of the breach. A warning message could be deposited in the dDB. This can be done in view of intentional non-fulfillment or in view of system failures.

Then, it is possible that the dDB is accessed for audit by external stakeholders (e.g. governmental institutions), both permanently during runtime and as periodical a posteriori audit.

Field devices of technical systems are enabled to adopt their configuration based on a pre-defined target parameter set while all configuration changes are transparently traced and validated.

Various examples are based on the finding that connected field devices often offer their functionalities based on VNFs that can be reconfigured during runtime. Hereinafter, techniques are described that facilitate configuration, re-configuration and tracking of configuration of VNFs through a dDB, specifically in view of enforcing operation constraints imposed on the VNFs. The operational constraints can be enforced, e.g., by a management entity of a respective system. The dDB allows all authorized participants in the ecosystem to validate and check proper configurations of the respective VNF. The decentralized dDB, e.g., realized as a blockchain, guarantees the data and business logic integrity and hereby.

Figure 1:
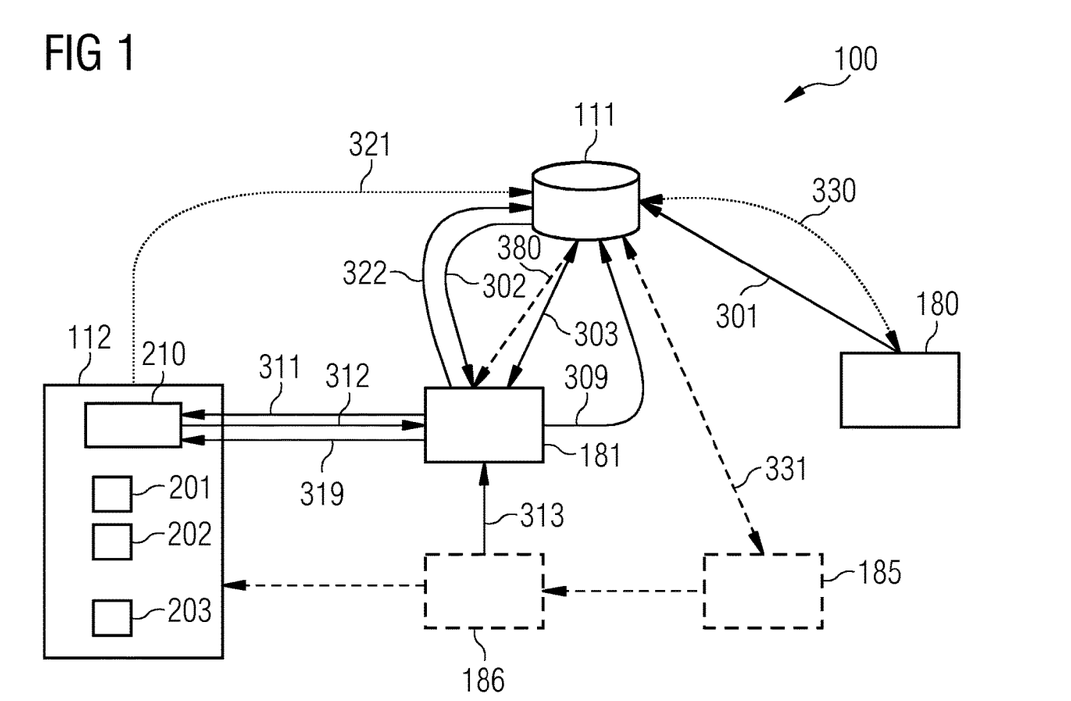
FIG. 1 schematically illustrates an architecture including nodes and devices and modules according to various examples.

FIG. 1 schematically illustrates an example system 100. The system 100 includes a dDB 111. The dDB 111 is configured to store all transactions between users and providers related to activation/deactivation of VNFs 201-203, operational constraints imposed on the VNFs 201-203, activation/deactivation of the operational constraints, etc. in an immutable way. The VNFs 201-203 are implemented on a field device 112.

The dDB 111 can provide an accountable system state, system state history, contractual business logic (e.g. which transaction should be triggered in a case that constraint is reached or SLA parameters are violated by any of the business partners?).

As a general rule, the dDB 111 could be realized as a blockchain where data blocks are blocks of a blockchain, blocks are linked via cryptographic measures in sequence, and system transactions are cryptographically signed by the initiator.

The dDB 111 is typically implemented as joint distributed infrastructure network including multiple infrastructure nodes (e.g. blockchain full node).

According to the various examples described herein, the dDB 111 can store information on operational constraints imposed on the VNFs 201-203 implemented by the field device 112. For example, the dDB 111 could store information on when an operational constraint has been activated or deactivated or (re-)configured.

A subscriber 180 (sometimes also referred to as user) offers or operates communication services that require definition of the operational constraints and/or parameter updates for specific VNFs 201-203 (e.g., industrial communication service needs a specific deep packet inspection for security reasons).

A provider node 181 operates and maintains the system and is contact point for the subscriber to activate ("buy") or deactivate VNFs 201-203 (e.g., virtual firewall, virtual switch, virtual DPI).

A management module 210 is operating and managing the field device 112, e.g., an operating system (OS) or a device controller. It is also responsible to keep the field device 112 in the configured state.

An external observer 185 is depicted that operates a sensor 186 allowing the external observer 186 to sense the operational state of the field device 112. The sensor 186 could be an antenna listening on a defined frequency in order to check a radio communication service being deactivated.

While in FIG. 1 a scenario is illustrated where there is only a single field device 112, a single subscriber 180, a single sensor 186, etc., as a general rule, there could be multiple entities that all access the common dDB 111.

Write parameter(s) and constraint(s) signal 301 can be communicated from the subscriber 180 to the dDB 111. Thereby, the subscriber 180 can define an operational constraints and parameters for a VNF 201-203 and writes operational constraints and associated parameter sets to the dDB 111.

A configuration signal 302 is communicated from the dDB 111 to the provider node 181. This can be upon receiving the write parameters and constraints signal 301, e.g., indicated by an optional event signal 380. The configuration signal 302 can be indicative of the operational constraint and the associated VNF 201-203 to which the operational constraint is applicable.

The provider node 181 can check at dDB 111 if a configuration of the field device 112 is valid. For this, a service level agreement associated with the operational function and the subscriber 180 can be retrieved at the dDB 111, e.g., using a validate signal 303. Then, the operational constraint can be validated based on the service level agreement that is associated with the VNF 201-203 and the subscriber 180. For example, the configuration signal 302 may be retrieved successful validation.

Based on the operational constraint and an associated parameter set obtained from dDB 111, the provider node 181 can configure the field device 112, typically via the management module 210. In other words, the provider node 181 can request enforcement of the operational constraint at the field device 112. For this, a configuration signal 311 can be transmitted from the provider node 181 to the field device 112.

This requested activation of the operational constraint could be written to the dDB 111, e.g., by a respective request data that is referenced to the VNF 201-203 and indicative of the requested enforcement. The request data could be provided as a request data signal 309 from the provider node 181 to the dDB 111.

The provider node can monitor the operational state of the field device 112 through the management module 210, e.g., by retrieving a state signal 312 indicative of the operational state of a given VNF 201-203. The operational state can be associated with the operational constraint configured using the configuration signal 311.

The operational state can be written to the dDB 111, with a reference to the respective VNF(s) 201-203. This can be done using a state signal 321 from the field device 112 to the dDB 111 and/or a state signal 321 from the provider node 181 to the dDB 111 (based on the state signal 312).

For example, one or more of the state signals 312, 321, 322 could be indicative of whether the VNFs 201-203 are activated or deactivated, whether operational constraints are activated or deactivated, or other operational parameters.

Using a check state signal 330, the subscriber 180 can audit/monitor the system status in the dDB 111. This functionality could also be provided to a third party.

The external observer 185 can be triggered to check the operational state through the dDB 111 using a trigger monitor signal 331. A respective state signal 313 can be provided from the sensor 186 to the provider node 181, or optionally from the sensor 186 directly to the dDB 111 (not illustrated in FIG. 1).

The provider node 181 may perform a comparison between the operational state of the field device 112, as indicated by the state signal 312 and/or the state signal 313, and the operational constraint, as indicated by the configuration signal 302. Then, fulfillment or non-fulfillment of the operational constraint can be judged.

As a general rule, such a comparison could also be implemented by any other interested node, e.g., by the subscriber 180 or an external node/third-party.

If non-fulfillment is observed, it is possible to transmit a control signal 319 to the field device 112, to control a parameter of the respective VNF 201-203. Alternatively or additionally, non-fulfillment of the operational constraint could be reported to another entity, e.g., the subscriber 180.

Figure 2:
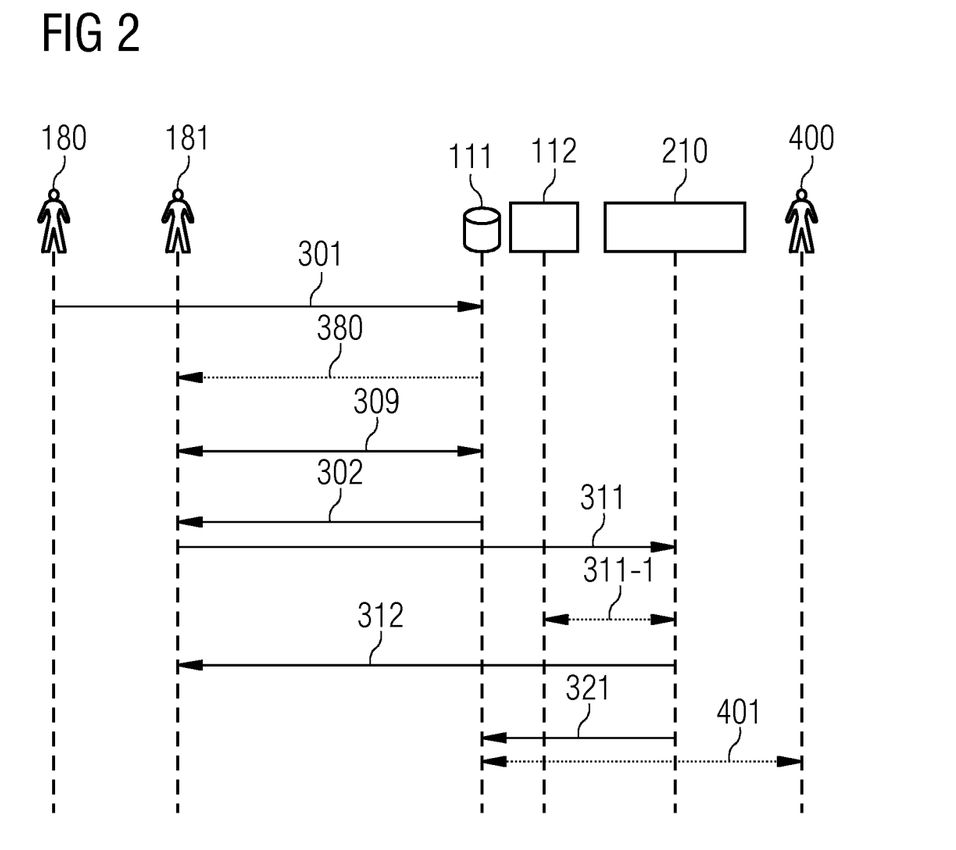
FIG. 2 is a signalling diagram of communication within the architecture of FIG. 1.

FIG. 2 is a signaling diagram that schematically illustrates the signaling of the various messages as explained in connection with FIG. 1.

The control signaling 311-1 to enforce the operational constraint by the management module 210 is also illustrated in FIG. 2. Also illustrated in FIG. 2 is an external node, e.g., of a manufacturer or another third party, that can access the dDB 111 via control signaling 401 to monitor fulfillment of the operational constraints.

The example of FIG. 2 illustrates how the proposed mechanisms can be used to implement activation of product features based on proper setup of the product in a predefined environment, such as the customer's network. The customer obtains the right to use a maintenance services for his product that is enabled by a specific VNF 201-203. This product feature should only be active as long as the purchased product is placed inside the customer's premises. This is expressed by an operational constraint and the associated parameter set (e.g., a pre-configuration for identification of user network) given to ddDB 111 using the parameters and constraints signal 301. The customer's network administrator receives, at the provider node 181, a notification from ddDB 111, in the form of the event signal 380. The provider node 181 can validate the required configuration update that enables enforcement of the operational constraint. All required parameters for the configuration update can be retrieved by the provider node 181 as the configuration signal 302 from the dDB 111. The provider node 181 can then configure the parameters for this operational constraint via the product maintenance interface/entity that controls the field device 112, i.e., using the configuration signal 311. Thereby, the enforcement of the operational constraint is requested. The field device's maintenance interface/entity is then reporting status updates, by the state signal 321, to the ddDB 111 and the manufacturer/third party 400 can monitor activated/deactivated features through dDB 111. A state signal 312 is also provided to the provider node 181.

The example of FIG. 2 can be extended to product license activation in combination with product communication features (e.g., user interface only accessible when properly registered and proper registration is done according to above described mechanism). Such a scenario is illustrated in FIG. 3.

Figure 3:
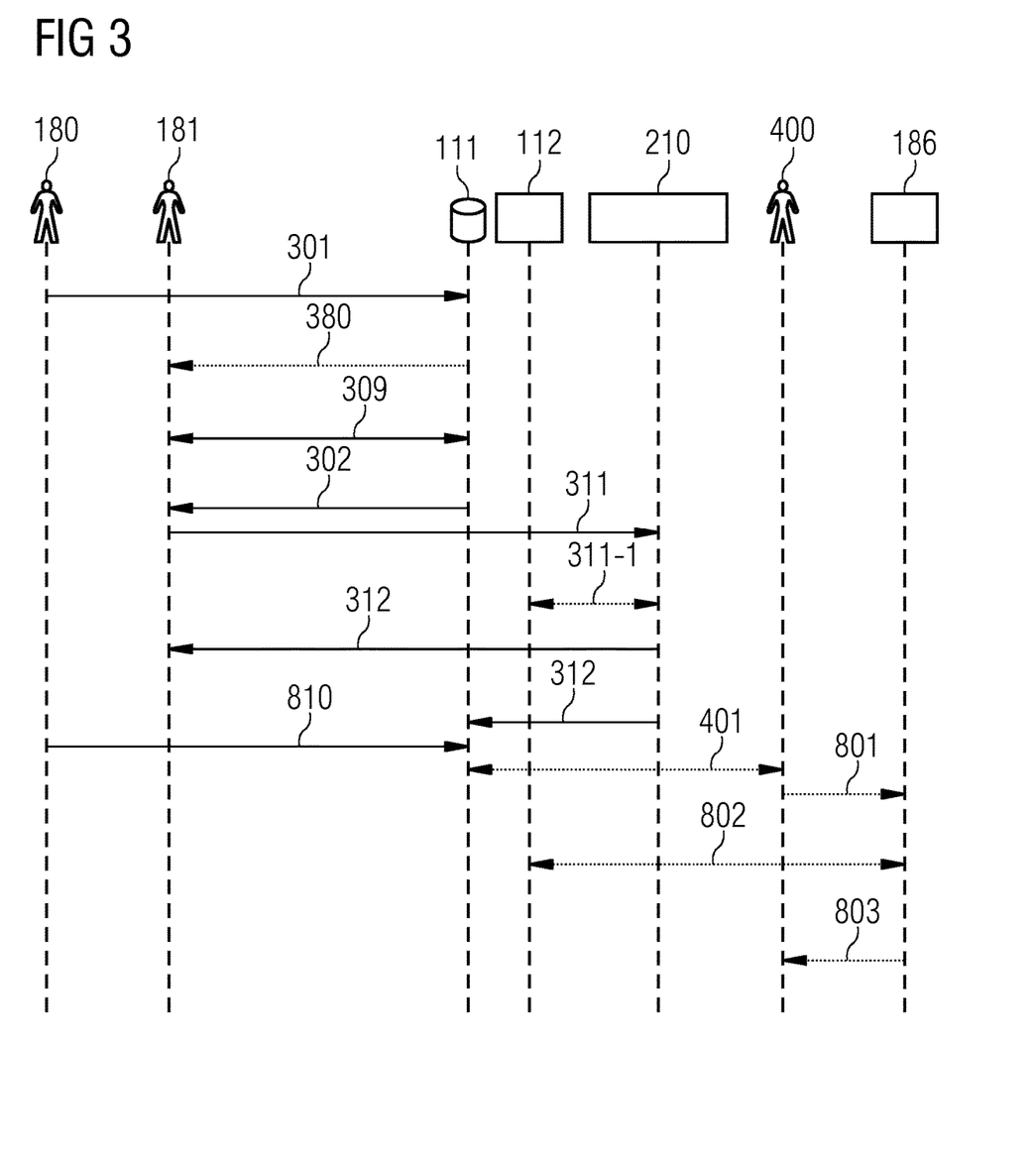
FIG. 3 is a signalling diagram of communication within the architecture of FIG. 1.

FIG. 3 is a signaling diagram that schematically illustrates the signaling of the various messages as explained in connection with FIG. 1.

The example shown in FIG. 3 shows how industrial communication services via satellites can be activated/deactivated based on the geo-location of the satellite. In this scenario the satellite service provider needs to make sure that a specific industrial satcom service X is not available when the satellite is flying over a specific country. This operational constraint is given to dDB 111, using the parameters and constraints signal 301. The satellite operator receives an event signal 380 at the provider node 181 and after validation and reading of required parameters from dDB 111 (signals 309 and 302), the satellite operating system of the field device 112 is configured accordingly using the configuration signal 311. The satellite OS is reporting updated state signals 321 to dDB 111 and/or to the provider node 181 (state signal 312) and as soon as the satellite reaches the given geo-locations the network function 201-203 for industrial communication service X is deactivated, to fulfill the operational constraint. This status update is also reported to dDB 111 and/or the provider node 181 using a respective state signal 321 or 312. The country 400 then can verify at dDB 111 the proper configuration of the satellite during fly-over, i.e., fulfillment of the operational constraint. In addition, the country 400 can use its own managed sensors 186 to validate that the given operational state of the field device 112 and configuration setup matches the own measurements of satellite system behavior. A respective query signal 801 and a respective state signal 803 are illustrated in FIG. 3. The sensor 186 may also communicate with the field device 112, 802.

In FIG. 3 also the subscriber 180 may query the operational state from the dDB 111 using a respective query signal 810.

Figure 4:
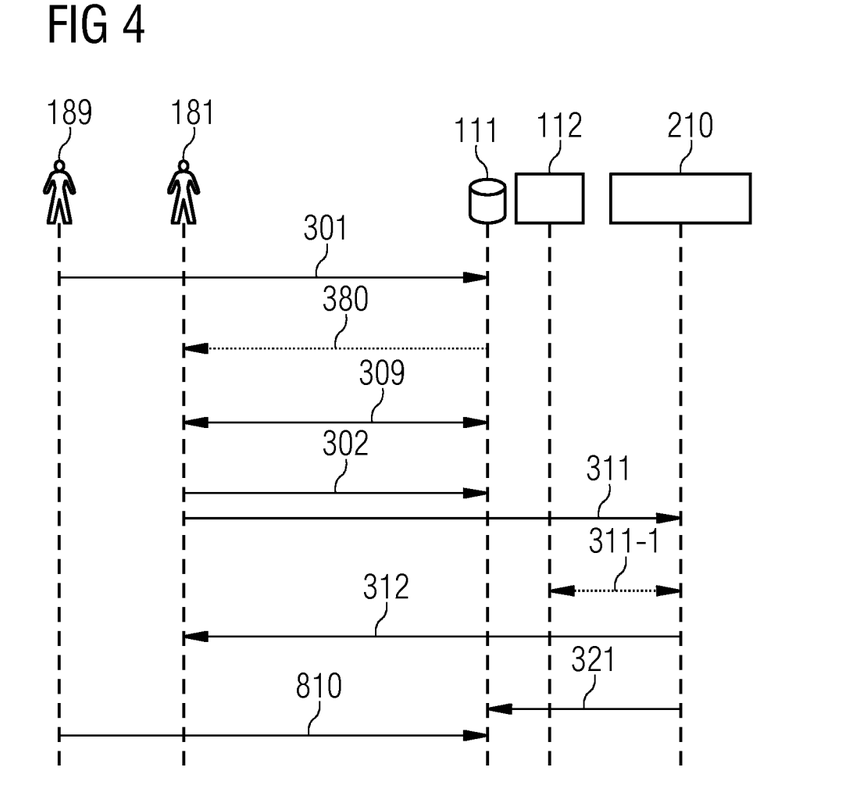
FIG. 4 is a signalling diagram of communication within the architecture of FIG. 1.

FIG. 4 is a signaling diagram that schematically illustrates the signaling of the various messages as explained in connection with FIG. 1.

The example of FIG. 4 shows how a network function 201-203 inside a field device 112 implemented by a mobile phone (here as example the hands-free speakerphone) can be activated/deactivated depending on the velocity the field device 112 moving. This operational constraint can be configured by public authorities 189, i.e., by a third-party entity different from the subscriber 180. The operational constraint is submitted with the corresponding parameter set to ddDB, using the parameters and constraints signal 301. The telecommunication network provider is notified from dDB using the event signal 380 and can validate the required configuration update before obtaining the operational constraint and associated parameter sets, signals 309, 302. The provider node 181 then configures the mobile phone 112 via the operating system 210 and the mobile phone operating system is reporting its status to dDB 111 using the state signal 321 and to the provider node 181 using the state signal 312. As soon as the mobile phone 112 moves faster and exceeds the conditional threshold configured in the operational constraint, network functions 201-203 associated to direct calls are deactivated and calls via hands-free speakerphone are activated. The mobile phone OS 210 reports this configuration updated to dDB 111 using the state signal 321. Public authorities 189 can check proper configuration of devices via the dDB 111.

Above example can also simply be extended by the provider node 181 writing call data to the dDB 111 as well. Thus, it is possible to discover inconsistencies in case users try to circumvent given constraints.

In another embodiment the accounting and paying for VNFs is also realized via the dDB 111.

In another embodiment breaching agreed parameters/SLA lead (state report, external sensor measurements do not match VNF parameter/constraint agreements) to automatic execution of agreed transactions (e.g. reporting, warning, transfer fines, change parameters of other VNFs 201-203, deactivate VNFs 201-203) via the dDB mechanisms.

Figure 5:
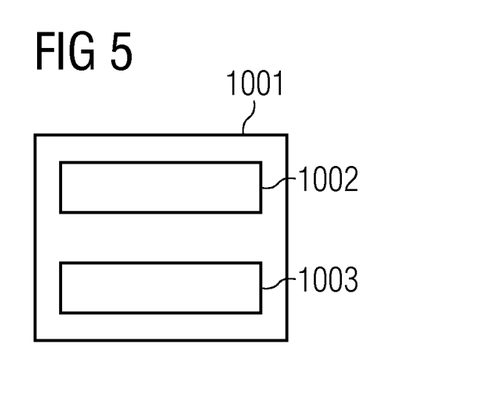
FIG. 5 schematically illustrates a node according to various examples.

FIG. 5 schematically illustrates a node 1001. For example, the node 1001 could be implemented by an infrastructure node of the dDB 111, by the provider node 181, or by a management module 210 of the field device 112 (cf FIG. 1).

The node 1001 includes a retrieval module 1002 that is configured to retrieve a state signal that is indicative of a operational state of an operational function of a field device. The operational status associated with an operational constraint.

For example, if the node 1001 is implemented by an infrastructure node of the dDB 111, the state signal 321 may be received from the field device 112. For example, if the node 1001 is implemented by the provider node 181, the state signal 312 may be received from the field device 112. For example, if the node 1001 is implemented by the management module 210, the state signal may be received from one of the VNFs 201-203 or from another sensor of the field device 112.

The node 1001 also includes a logging module 1003 that is configured to write, to a dDB, the operational state referenced to the operational function.

For example, if the node 1001 is implemented by an infrastructure node of the dDB 111, such writing can include contacting one or more other infrastructure nodes of the dDB 111, e.g., for validation of a corresponding transaction. For example, the node 1001 is implemented by the provider node 181, writing can include transmitting a corresponding request one or more infrastructure nodes of the dDB 111. For example, if the node 101,001 is implemented by the management module 210, writing can include transmitting a corresponding request to one or more infrastructure nodes of the dDB 111.

The node 1001 may optionally include a monitoring module configured to perform a comparison between the operational state and the operational constraint (not illustrated in FIG. 5).

The node 1001 may optionally include a control module configured to control a parameter of the operational function of the field device if the comparison indicates non-fulfillment of the operational constraint (not illustrated in FIG. 5).

The node 1001 may optionally include a report module configured to report non-fulfillment of the operational constraint if the comparison of the state of the operational function with the operational constraint indicates non-fulfillment of the operational constraint (not illustrated in FIG. 5).

Figure 6:
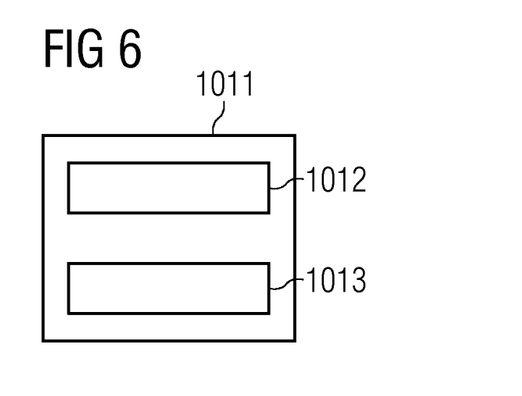
FIG. 6 schematically illustrates a node according to various examples.

FIG. 6 schematically illustrates a node 1011. For example, the node 1011 could be implemented by the provider node 181.

The node 1011 includes a retrieval module 1012 which is configured to retrieve a configuration signal from a dDB, e.g., the configuration signal 302. The configuration signal is indicative of an operational function and an associated operational constraint.

The node 1011 also includes a deployment module 1013 that is configured to request enforcement of the operational constraint at a field device that implements the operational function. For example, for this, the configuration signal 311 may be transmitted.

The node 1011 may optionally include a validation module configured to validate the operational constraint based on a service level agreement associated with the operational function and a subscriber associated with the field device (not illustrated in FIG. 6).

The node 1011 may optionally include a logging module configured to write, to the distributed database, request data referenced to the operational function, the request data being indicative of the requested enforcement (not illustrated in FIG. 6).

Figure 7:
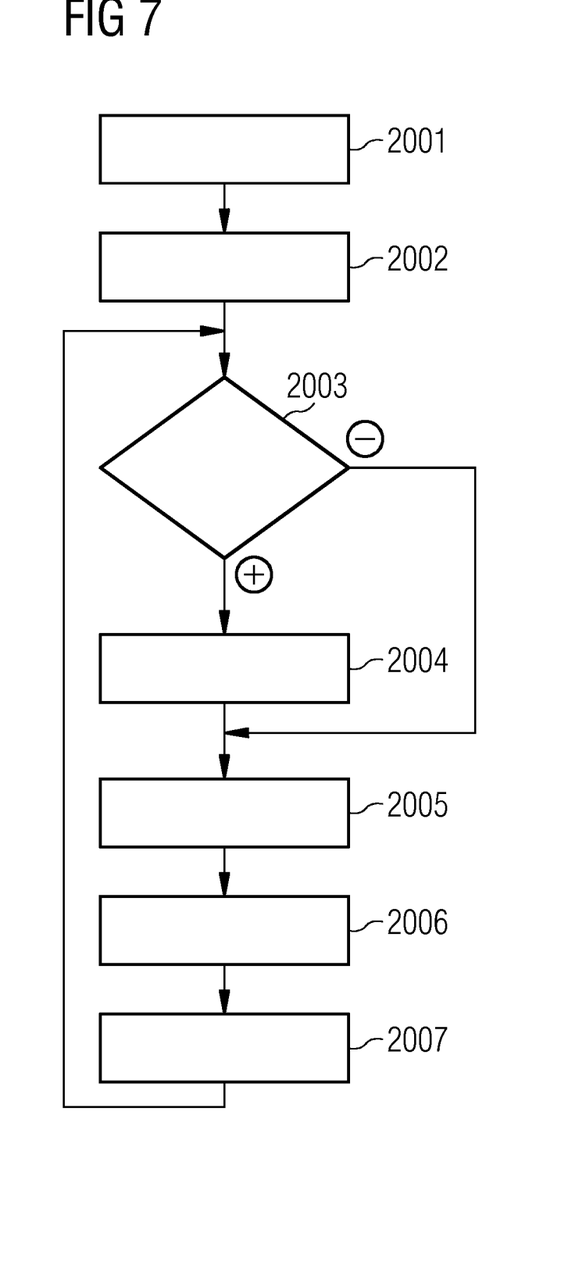
FIG. 7 is a flowchart of a method according to various examples.

FIG. 7 is a flowchart of a method according to various examples.

Initially, at block 2001, an operational constraint is set. The operational constraint can be set by a subscriber associated with the field device and/or by a third party, e.g., a third party that is affected by the operation of the field device. Setting of the operational constraint can include writing the operational constraint together with a reference to an operational function and/or the field device to a dDB. For example, see parameters and constraints signal 301 discussed above.

Next, at block 2002, the operational constraint is configured, i.e., enforcement of the operational constraint is requested. For this, a respective configuration signal may be used, e.g., see configuration signal 302 discussed above. Then, based on the configuration signal, an operating system of the field device can be configured accordingly.

As a general rule, the operational constraint can be conditional. I.e., the operational constraint can be activated or deactivated depending on certain trigger criteria including, e.g., an environmental setting or timings.

Accordingly, at block 2003, it is checked whether such a trigger criterion of the conditional operational constraint is fulfilled. In case the trigger criterion is fulfilled, then the method commences at block 2004; otherwise block 2004 is skipped and the operational constraint idles.

At block 2004, the operational constraint is activated. For example, the operational system of the field device can appropriately act upon the respective operational function. Activation of the operational constraint causes a change in the behavior of the respective operational function; thereby causing change in the operational state of the field device.

At block 2005, a state signal that is indicative of the operational state is retrieved. For example, this may be the state signal 321 or the state signal 312 or the state signal 322 or the state signal 313 as discussed above.

Then, at block 2006, the operational state—as indicated by the state signal—is written to the dDB, together with a reference to the operational function to which it pertains. Thereby, it becomes possible to audit fulfilment of the operational constraint, based on the operational state.

A comparison between the operational state and the operational constraint to check whether the operational constraint is fulfilled can be implemented at optional block 2007. As a general rule, such a fulfilment check can be independent of the implementation/enforcement of the operational constraint, e.g., it could be performed afterwards or by another entity not involved in the implementation/enforcement of the operational constraint. As such, block 2007 may be separately executed from the remaining blocks 2001-2006.

FIG. 7 illustrates a sequence of blocks. In some examples, another sequence of blocks may be used. IT would generally also be possible to use two or more parallel threads to implement processing of at least some of the blocks in parallel: to give an example, it would be possible that blocks 2003-2004 are executed by a first thread; and blocks 2005-2006 are executed by a second thread. In another example, it would be possible to implement blocks 2002 and 2003 by parallel threads.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A node for tracking fulfillment of an operational constraint imposed on an operational function of a field device, the node comprising:

a retrieval module configured to retrieve a state signal indicative of an operational state of the operational function of the field device, the operational state being associated with the operational constraint, and a logging module configured to write, to a distributed database, the operational state referenced to the operational function wherein:

the operational constraint is conditional on one or more trigger criteria, wherein the operational constraint is activated or deactivated depending on the trigger criteria; and the retrieval module is configured to retrieve a constraint signal indicative of the operational constraint from the distributed database, wherein the distributed database is a database that is distributed over a multitude of infrastructure nodes, wherein transactions are selectively deposited in the distributed database depending on a consensus between the infrastructure nodes.

2. The node of claim 1, wherein one of the trigger criteria is an environmental setting of the field device, wherein the retrieval module is configured to retrieve a further state signal indicative of the environmental setting, upon retrieving the state signal, wherein the logging module is configured to write, to the distributed database, the operational state further referenced to the environmental setting.

3. The node of claim 2, wherein the environmental setting comprises at least one of location, velocity, acceleration, temperature, pressure, and brightness.

4. The node of claim 1, wherein the node further comprises:

a monitoring module configured to perform a comparison between the operational state and the operational constraint.

5. The node of claim 4, further comprising:

a control module configured to control a parameter of the operational function of the field device if the comparison indicates non-fulfillment of the operational constraint.

6. The node of claim 4, further comprising:

a report module configured to report non-fulfillment of the operational constraint if the comparison of the operational state of the operational function the operational constraint indicates non-fulfillment of the operational constraint.

7. The node of claim 1, wherein the retrieval module is configured to retrieve the state signal from a sensor remote of the field device.

8. The node of claim 1, wherein the retrieval module is configured to receive the state signal from the field device.

9. The node of claim 1, wherein the operational function a virtual network function.

10. A node for configuring an operational constraint associated with an operational function a field device the node comprising:

a retrieval module configured to retrieve a configuration signal from a distributed database, the configuration signal being indicative of the operational function and of the operational constraint, and a deployment module configured to request enforcement of the operational constraint at the field device wherein:

the operational constraint is conditional on one or more trigger criteria, wherein the operational constraint is activated or deactivated at the field device depending on the trigger criteria;

the distributed database is a database that is distributed over a multitude of infrastructure nodes, wherein transactions are selectively deposited in the distributed database depending on a consensus between the infrastructure nodes.

11. The node of claim 10, further comprising:
a validation module configured to validate the operational constraint based on a service level agreement associated with the operational function a subscriber associated with the field device.

12. The node of claim 10, further comprising:
a logging module configured to write, to the distributed database request data referenced to the operational function, the request data being indicative of the requested enforcement.

13. A method of tracking fulfillment of an operational constraint imposed on an operational function of a field device, the method comprising:
retrieving a state signal indicative of an operational state of the operational function of the field device, the operational state being associated with the operational constraint, and
writing, to a distributed database the operational state referenced to the operational function
wherein
the operational constraint is conditional on one or more trigger criteria, wherein the operational constraint is activated or deactivated depending on the trigger criteria; and the method further comprises retrieving a constraint signal indicative of the operational constraint from the distributed database, wherein the distributed database is a database that is distributed over a multitude of infrastructure nodes, wherein transactions are selectively deposited in the distributed database depending on a consensus between the infrastructure nodes.

14. A method of configuring an operational constraint associated with an operational function of a field device, the method comprising:
retrieving a configuration signal from a distributed database, the configuration signal being indicative of the operational function and of the operational constraint, and
requesting enforcement of the operational constraint at the field device wherein:
the operational constraint is conditional on one or more trigger criteria, wherein the operational constraint is activated or deactivated at the field device depending on the trigger criteria;
the distributed database is a database that is distributed over a multitude of infrastructure nodes, wherein transactions are selectively deposited in the distributed database depending on a consensus between the infrastructure nodes.

* * * * *